United States Patent
Leone et al.

(10) Patent No.: US 10,343,687 B2
(45) Date of Patent: Jul. 9, 2019

(54) TRACTION CONTROL SYSTEM UTILIZING TRANSMISSION BRAKING

(71) Applicant: Ford Global Technologies, LLC, Dearborn, MI (US)

(72) Inventors: Thomas G. Leone, Ypsilanti, MI (US); Zhengyu Dai, Canton, MI (US); Jianbo Lu, Northville, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 15/810,749

(22) Filed: Nov. 13, 2017

(65) Prior Publication Data

US 2019/0143985 A1 May 16, 2019

(51) Int. Cl.
| | |
|---|---|
| *B60W 10/06* | (2006.01) |
| *B60W 10/10* | (2012.01) |
| *B60W 30/18* | (2012.01) |
| *B60W 10/02* | (2006.01) |

(52) U.S. Cl.
CPC ...... *B60W 30/18172* (2013.01); *B60W 10/02* (2013.01); *B60W 10/06* (2013.01); *B60W 10/10* (2013.01); *B60W 2510/0657* (2013.01); *B60W 2520/26* (2013.01); *B60W 2710/0666* (2013.01)

(58) Field of Classification Search
CPC .............. B60W 10/06; B60W 10/10; B60W 30/18172; B60W 2520/26; B60W 2710/0666
See application file for complete search history.

(56) References Cited

U.S. PATENT DOCUMENTS

| | | | |
|---|---|---|---|
| 6,782,961 B1 | 8/2004 | Ishikawa et al. | |
| 6,976,388 B2 | 12/2005 | Heap et al. | |
| 7,101,313 B2 | 9/2006 | Kresse et al. | |
| 7,252,621 B2* | 8/2007 | Tanba ................. | B60W 10/113 477/77 |
| 7,399,256 B2* | 7/2008 | Tanba ................. | B60W 10/113 477/71 |
| 7,575,084 B2* | 8/2009 | Fujimoto ............ | B60K 28/165 180/245 |
| 9,272,703 B2 | 3/2016 | Larsson et al. | |
| 2004/0259684 A1* | 12/2004 | Kresse ................. | B60W 10/06 477/115 |
| 2005/0137058 A1* | 6/2005 | Fujimoto ............ | B60K 28/165 477/166 |
| 2005/0252283 A1* | 11/2005 | Heap ................... | B60K 6/365 73/115.02 |
| 2005/0282683 A1* | 12/2005 | Tanba ................. | B60W 10/113 477/180 |

(Continued)

*Primary Examiner* — David R Morris
(74) *Attorney, Agent, or Firm* — David Kelley; Brooks Kushman P.C.

(57) ABSTRACT

A vehicle includes a transmission having input and output shafts and clutches engageable in combinations to create power-flow paths between the input and output shafts. The vehicle further includes wheels driven by the output shaft and a controller. The controller is programmed to engage one of the combinations, and, responsive to the wheels slipping and a desired engine torque reduction exceeding a threshold, command capacity to an additional one of the clutches to reduce torque of the output shaft.

16 Claims, 5 Drawing Sheets

(56) References Cited

U.S. PATENT DOCUMENTS

2007/0202988 A1* 8/2007 Tanba .................. B60W 10/113
                                                                                    477/80
2015/0105992 A1* 4/2015 Larsson ............. B60K 23/0808
                                                                                    701/89

* cited by examiner

TRACTION CONTROL SYSTEM UTILIZING TRANSMISSION BRAKING

TECHNICAL FIELD

The present disclosure relates to traction control systems, and more specifically to traction control systems that utilize transmission braking, via clutch tie-up, to supplement reductions in engine torque during certain conditions.

BACKGROUND

Traction control, when activated, can override a driver requested torque and operate the engine at a reduced torque output and/or increases wheel braking to reduce wheel spin. The reduced wheel spin, or slip, can increase directional stability and traction between the wheels and road surface to enable a vehicle to negotiate low friction surfaces.

SUMMARY

According to one embodiment, a vehicle includes a transmission having input and output shafts and clutches engageable in combinations to create power-flow paths between the input and output shafts. The vehicle further includes wheels driven by the output shaft and a controller. The controller is programmed to engage one of the combinations, and, responsive to the wheels slipping and a desired engine torque reduction exceeding a threshold, command capacity to an additional one of the clutches to reduce torque of the output shaft.

According to another embodiment, a vehicle includes an engine and a transmission coupled to the engine. The transmission includes an input shaft, an output shaft, and clutches engageable in at least a first combination, which is a subset of the clutches, to create a gear ratio between the input and output shafts. The gear ratio has an associated tie-up clutch configured to exert a braking torque on the output shaft when the tie-up clutch is partially engaged. A vehicle controller is programmed to, responsive to wheel slip being detected and a requested torque reduction of the engine exceeding a threshold, commanding torque capacity to the tie-up clutch to reduce torque of the output shaft.

According to yet another embodiment, a method of controlling a vehicle powertrain including a transmission having at least one tie-up clutch configured to reduce output torque of the transmission when engaged is presented. The method includes, responsive to wheel slip being detected and a requested engine torque being undeliverable, (i) commanding a minimum engine torque and (ii) commanding torque capacity to the tie-up clutch to reduce the output torque of the transmission to a value corresponding with the requested engine torque.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
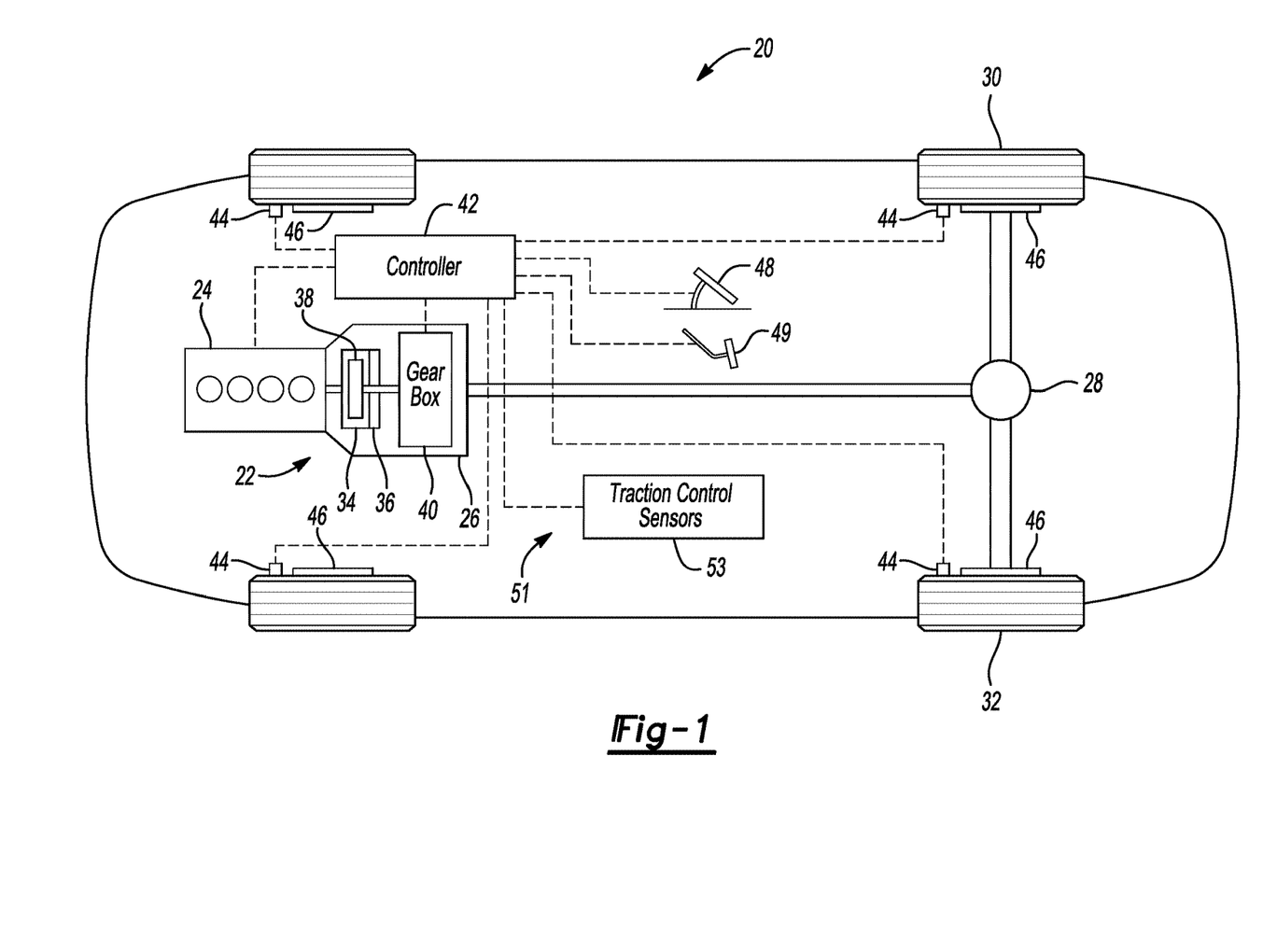
FIG. 1 is a schematic diagram of a vehicle including a traction control system according to one or more embodiments of this disclosure.

An example vehicle 20 includes a powertrain 22 having an engine 24 and a transmission 26. While illustrated as rear-wheel drive, the teachings of this disclosure are equally applicable to front-wheel drive, four-wheel drive, or all-wheel drive vehicles. The engine 24 generates mechanical power. The transmission 26 transmits the power to a differential 28 at a shaft speed suited to current vehicle needs, which may be faster or slower than the shaft speed at which the engine 24 generates the power. The differential 28 reduces the shaft speed by a fixed final-drive ratio and transmits the power to the left and right driving wheels 30 and 32, allowing for slight speed differences between the wheels as the vehicle turns a corner.

The transmission 26 includes a gearbox 40 having a collection of rotating elements and shift elements configured to impose specified speed relationships between the transmission input and output shafts. The shift elements may be clutches. A clutch that holds an element against rotation by selectively connecting the element to the transmission housing may be called a brake. Used herein, the term "clutch" is generic and includes clutches and brakes. The gearbox 40 establishes different speed ratios by engaging various subsets of the clutches. In some embodiments, a transmission pump provides pressurized fluid that engages the shift elements, which are hydraulically controlled by a valve body.

The transmission 26 may include a torque converter 34 or other launch device. The torque converter 34 includes an impeller 36 fixed to the engine crankshaft and a turbine 38 fixed to the transmission input shaft. Torque is transferred hydro-dynamically from the impeller 36 to the turbine 38 when the impeller rotates faster than the turbine. A bypass clutch may be engaged to transfer torque by friction from the impeller 36 to the turbine 38 to reduce the power loss inherent in the hydrodynamic power transfer.

The vehicle 20 includes a controller 42 that may be a vehicle-based computing system that includes one or more controllers that communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" refers to one or more controllers. An example of a vehicle-based computing system is the SYNC system manufactured by THE FORD MOTOR COMPANY. The controller 42 may include an engine control module (ECM) that operates at least the engine, a powertrain control module (PCM) that operates at least the transmission and others.

An accelerator pedal 48 provides operator input to control a speed of the vehicle 20. The engine 24 may have an electronically controlled throttle body. The pedal 48 may include a pedal-position sensor that provides a pedal-position signal to the controller 42, which provides control signals to the throttle body and other engine components. The controller 42 may use the pedal-position signal to determine a driver-demanded torque (also known as an engine-torque request). The driver-demanded torque may also be generated by the controller 42 independent of the pedal-position signal.

The vehicle 20 may be equipped with an anti-lock braking system (ABS) that includes friction brakes 46 and wheel-speed sensors 44 located at each of the wheels. The braking system may be a hydraulic braking system having a control module (not shown) for distributing fluid pressure among the friction brakes 46. The control module may be controlled by operation of a brake pedal 49 and/or the controller 42 without input from the driver. In other embodiments, the braking system may be electronic, or combinations thereof. The controller 42 may be programmed to sense wheel slip via the sensors 44 and to reduce braking force at slipping wheels to increase directional stability and/or traction during the braking.

The vehicle 20 also includes a traction control system 51 configured to reduce wheel slip as well as provide stability control of the vehicle. The traction control system 51 may command reduced torque production of the engine 24 as well as individual wheel braking and torque vectoring in order to increase traction and provide directional control of the vehicle. The traction control system 51 and the ABS may be integrated with each other. The traction control system 51 may utilize the wheel-speed sensors 44 to provide information for traction control among other purposes. The wheel-speed sensors 44 may be coupled directly to the wheels. In some embodiments, the wheel-speed signals may be the output from the anti-lock brake system, an axle sensor, etc.

The traction control system 51 includes, in addition to the wheel-speed sensors 44, a plurality of traction-control sensors 53 such as a yaw-rate sensor, a lateral-acceleration sensor, and a longitudinal-acceleration sensor. The yaw-rate sensor generates a yaw-rate signal corresponding to the yaw rate of the vehicle. Using the yaw rate sensor, the yaw acceleration may also be determined. The lateral-acceleration sensor outputs a lateral-acceleration signal corresponding to the lateral acceleration of the vehicle body. The longitudinal-acceleration sensor generates a longitudinal-acceleration signal corresponding to the longitudinal acceleration of the vehicle. The various sensors may be directly coupled to various vehicle dynamic control systems, such as a yaw-control system or the rollover stability-control system. A roll-rate sensor may also be used to determine load transfer for the vehicle.

Typical traction control systems increase directional stability and/or tire traction by reducing engine torque and applying the wheel brakes to achieve a desired wheel torque. Engine torque may be reduced by retarding the spark and/or by reducing throttle opening and fuel. Reducing engine torque is sufficient to minimize wheel spin in many situations, however, in certain situations, it is difficult or impossible to reduce engine torque quickly enough to achieve the desired engine-torque reduction. This is particularly true when the desired torque reduction of the engine is greater than that achievable by spark retard. One example of this is accelerating the vehicle from a high traction surface to a low traction surface. In this situation, it is difficult to reduce the powertrain torque output and/or control the powertrain rotating inertia quickly enough to avoid excessive wheel spin and loss of directional control. Stated another way, the engine has a minimum engine torque (sometimes called lowest feasible engine torque) at any instantaneous time, and if the desired engine-torque reduction requires less engine torque than the minimum engine torque, the engine is unable to provide the desired wheel torque alone. Wheel braking can be used to supplement the engine torque reduction, but controlling the wheel torque with the friction brakes can be challenging when the powertrain torque is much greater than available traction at the wheels.

In order to solve the above described deficiency, the traction control system 51 is configured to create a partial tie-up condition within the gearbox 40 to create a braking torque on the output shaft of the transmission 26 when the desired reduction in powertrain torque exceeds engine capabilities. The traction control system 51 may use transmission tie-up in conjunction with reduced engine torque and wheel braking in order to minimize wheel spin. Placing the transmission in a partial tie-up may be referred to as transmission braking.

Transmission tie-up will be described in conjunction with the example transmission 26 schematically illustrated in FIG. 2. It is to be understood, however, that the traction control system 51 may be utilized with any step-ratio transmission.

Figure 2:
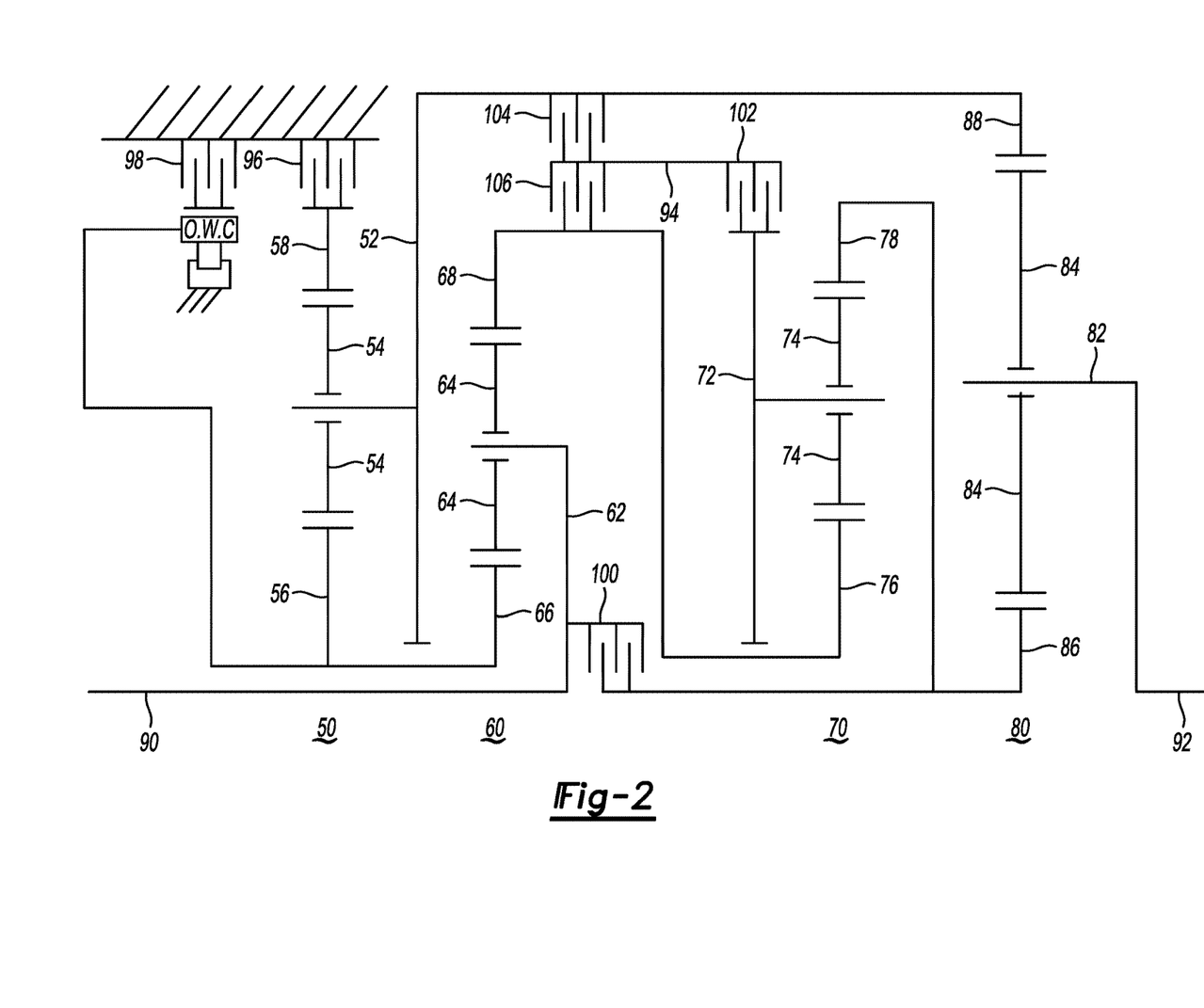
FIG. 2 is a schematic diagram of an example transmission of the vehicle of FIG. 1.

Referring to FIG. 2, the transmission 26 may utilize four simple planetary gear sets 50, 60, 70, and 80. A planet carrier 52 rotates about a central axis and supports a set of planet gears 54 such that the planet gears rotate with respect to the planet carrier. External gear teeth on the planet gears mesh with external gear teeth on a sun gear 56 and with internal gear teeth on a ring gear 58. The sun gear and ring gear are supported to rotate about the same axis as the carrier. A simple planetary gear set imposes a fixed speed relationship. The speed of the carrier is constrained to be between the speed of the sun gear and the speed of the ring gear. (This relationship is defined to include the condition in which all three rotate at the same speed.) More specifically, the speed of the carrier is a weighted average of the speed of the sun gear and the speed of the ring gear with weighting factors determined by the number of teeth on each gear. Similar speed relationships are imposed by other known types of fixed gearing arrangements. For example, a double pinion planetary gear set constrains the speed of the ring gear to be a weighted average between the speed of the sun gear and the speed of the carrier. Gear sets 60, 70, and 80 are similarly structured.

An example ratio of gear teeth for each planetary gear set is listed in Table 1.

TABLE 1

| | |
|---|---|
| Ring 58/Sun 56 | 2.20 |
| Ring 58/Sun 66 | 1.75 |
| Ring 58/Sun 76 | 1.60 |
| Ring 58/Sun 86 | 3.70 |

In the example transmission of FIG. 2, sun gear 56 is fixedly coupled to sun gear 66, carrier 52 is fixedly couple to ring gear 88, ring gear 68 is fixedly coupled to sun gear 76, ring gear 78 is fixedly coupled to sun gear 86, input shaft 90 is fixedly coupled to carrier 62, and output shaft 92 is fixedly coupled to carrier 82. Ring gear 58 is selectively held against rotation by clutch 96, and sun gears 56 and 66 are selectively held against rotation by clutch 98. Input shaft 90 is selectively coupled to ring gear 78 and sun gear 86 by clutch 100. Intermediate shaft 94 is selectively coupled to carrier 72 by clutch 102, selectively coupled to carrier 52 and ring gear 88 by clutch 104, and selectively coupled to ring gear 68 and sun gear 76 by clutch 106.

As shown in Table 2, engaging the clutches in combinations of four establishes ten forward speed ratios and one reverse speed ratio between input shaft 90 and output shaft 92. An X indicates that the clutch is required to establish the speed ratio. An (X) indicates the clutch can be applied but is not required. In $1^{st}$ gear, either clutch 104 or clutch 106 can be applied instead of applying clutch 102 without changing the speed ratio. When the gear sets have tooth numbers as indicated in Table 1, the speed ratios have the values indicated in Table 2.

TABLE 2

| | 96 | 98 | 100 | 102 | 104 | 106 | Ratio | Step |
|---|---|---|---|---|---|---|---|---|
| Rev | X | X | | X | X | | −4.79 | 102% |
| $1^{st}$ | X | X | X | (X) | | | 4.70 | |
| $2^{nd}$ | X | X | | X | | X | 2.99 | 1.57 |
| $3^{rd}$ | X | | X | X | | X | 2.18 | 1.37 |
| $4^{th}$ | X | | | X | X | X | 1.80 | 1.21 |
| $5^{th}$ | X | | X | | X | X | 1.54 | 1.17 |
| $6^{th}$ | X | | X | X | X | | 1.29 | 1.19 |
| $7^{th}$ | | | X | X | X | X | 1.00 | 1.29 |
| $8^{th}$ | | X | X | X | | X | 0.85 | 1.17 |
| $9^{th}$ | | X | X | | X | X | 0.69 | 1.24 |
| $10^{th}$ | | X | | X | X | X | 0.64 | 1.08 |

The clutches 96-106 may be hydraulic and include clutch packs and pistons. The clutches are controlled by a valve body that engages the clutches by providing pressurized fluid to the pistons to compress the clutch packs. The valve body is controlled by the controller 42. The pistons may be disposed within a supply dam configured to receive fluid from the valve body. The clutches are engaged by first stroking the piston by supplying a sufficient amount of fluid pressure to the supply dam to place the piston in resting contact with disk of the clutch, and subsequently supplying additional fluid pressure to compress the clutch packs generating torque capacity. Other types of clutches are known, and this disclosure is not limited to hydraulically actuated clutches.

Generally, the transmission 26 establishes a power-flow path between the input shaft and the output shaft when four of the six clutches are engaged. If an additional fifth clutch is partially engaged (i.e., slipping), a tie-up condition occurs within the gearbox 40. The additional clutch may be referred to as a "tie-up clutch." During a tie-up condition, the tie-up clutch applies a braking torque on the output shaft 92 according to the torque capacity of the tie-up clutch. In the transmission 26, the tie-up clutch is a fifth engaged clutch. In other transmissions, however, a third or fourth engaged clutch may be a tie-up clutch depending upon the amount of engaged clutches required to establish power-flow paths through the transmission.

The traction control system 51 includes an arbitrator that may be embedded in the controller 42. The arbitrator determines the location(s) and amount of wheel slip and arbitrates duties between various vehicle components to reduce or avoid wheel slip. For example, the arbitrator receives data from the wheel-speed sensors 44, the traction-control sensors 53, the engine 24, and the transmission 26, among others. Using this data, the arbitrator can determine if traction control is needed. If traction control is needed, the arbitrator calculates a desired torque at the wheels in order to reduce wheel slip. Reduction in wheel torque may be achieved by reducing engine torque, activating the ABS, transmission braking, or combinations thereof. Thus, the arbitrator may output a desired engine torque to the ECU, a desired transmission output torque to the PCM, and/or a desired wheel-braking torque to the ABS in order to reduce wheel slip depending upon the severity of the wheel slip. Based on these outputs, engine torque may be reduced, the ABS may apply a braking torque, and/or the transmission may apply torque capacity to a tie-up clutch as requested by the arbitrator.

As explained above, in many situations wheel slip can be sufficiently reduced by only reducing engine torque, i.e., the requested engine torque is greater than the minimum engine torque. But in other situations, the engine is either unable to sufficiently reduce the torque (i.e., the requested engine torque is less than the lowest feasible engine torque) or is unable to sufficiently reduce the torque in a desired amount of time. Engine torque can be quickly reduced by retarding spark, but torque reductions exceeding 40 percent are difficult to achieve. Engine torque can be further reduced by closing the throttle, but this torque reduction occurs over a relatively long period of time. The arbitrator may be programmed to command clutch capacity to a tie-up clutch in order to supplement torque reductions of the engine in situations where the desired powertrain-torque reduction exceeds the engine's capabilities to provide the torque reduction. For example, if the highest feasible engine torque reduction is 40 percent of current engine torque, then the arbitrator may command engagement of a tie-up clutch if the desired powertrain torque reduction exceeds 40 percent of current powertrain torque.

Control logic or functions performed by controller 42 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 42. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 3:
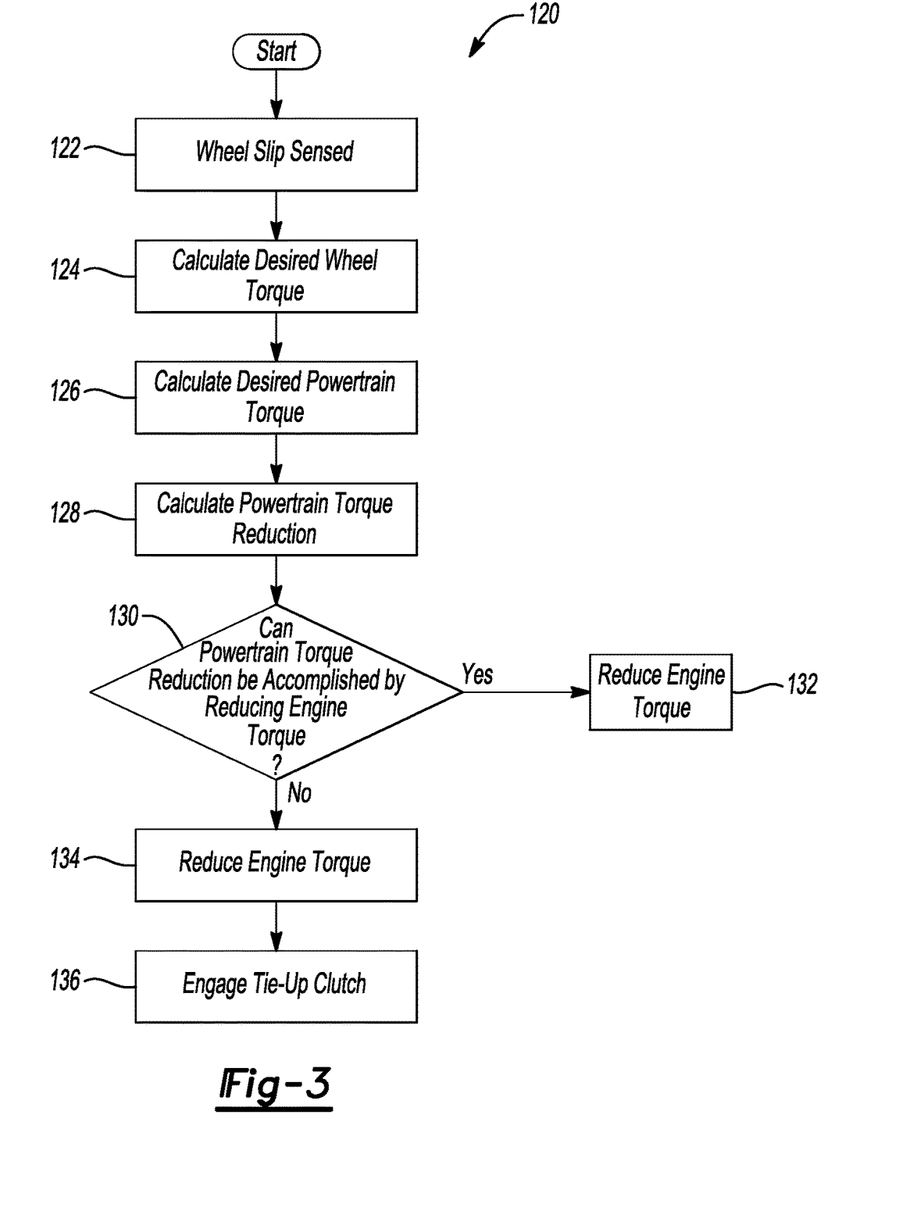
FIG. 3 is a method of operating the traction control system.

FIG. 3 is a method 120 for controlling the traction control system. The method begins at box 122 where a sufficient amount of wheel slip is sensed to trigger activation of the traction control system. At box 124 desired wheel torques are calculated. At box 126 a desired powertrain torque is calculated based on the desired wheel torques. The desired powertrain torque is a torque of the powertrain estimated to provide the desired wheel torque. The powertrain torque may be the torque at the output shaft of the transmission. In some vehicles, the differential is provided within the transmission, and the transmission output shaft torque is substantially equal to the wheel torque. In other vehicles, the differential is provided between the transmission output shaft and the driven wheels. Here, the wheel torque is a ratio of the output shaft torque plus or minus losses.

At box 128, a powertrain torque reduction is calculated that corresponds with the desired powertrain torque at box 126. The torque reduction may be calculated by first determining the current powertrain torque, such as at the transmission output shaft, and subsequently subtracting the desired powertrain torque from the current powertrain torque to calculate the desired torque reduction.

At box 130, it is determined if the desired powertrain torque reduction can be accomplished by reducing engine torque. The torque of the engine can be reduced by retarding spark. The amount of spark retard is limited by combustion stability and other factors. Engine torque can also be reduced by reducing throttle opening and/or modifying the cam timing, but these actions reduce torque more slowly than spark retard. Thus, the engine torque can only be reduced so much at any instantaneous point in time, i.e., the engine torque cannot be reduced below the minimum engine torque. To determine if the engine alone can accomplish the desired powertrain torque reduction, the desired powertrain torque is converted into an engine output torque. Powertrain torque and engine torque are proportional to each other and torques can be converted from one domain to the other as a function of transmission gear ratio, torque converter properties, rotating inertia, and losses. Once the desired engine torque is known, the desired engine torque reduction can be calculated by subtracting the desired engine torque from the current engine torque. The desired engine torque reduction is then compared to the highest feasible engine torque reduction (current engine torque minus minimum engine torque), and if the desired engine torque reduction is smaller than the highest feasible engine torque reduction, the engine is capable of providing the desired powertrain torque reduction alone. If the powertrain torque reduction can be accomplished by reducing the engine torque, the method moves to box 132 and the engine is commanded to reduce the engine output by the desired engine-torque reduction.

If it is determined at box 130 that the engine alone is incapable of fully providing the powertrain torque reduction, transmission braking may be used to supplement the engine. At box 134 the engine torque will be reduced to the minimum engine torque. At box 136 a tie-up clutch is engaged to further reduce the powertrain torque so that the torque of the transmission output shaft approximates the desired powertrain torque of box 126. The tie-up clutch will provide a transmission braking torque that is based on the difference between the desired engine torque and the minimum engine torque.

The method is periodically executed at a predefined frequency, e.g., 100 milliseconds, and the capacity of the tie-up will be adjusted in each iteration as the minimum engine torque and the wheel slip changes over time. The additional one of the clutches is disengaged in response to the desired powertrain torque reduction being achievable with reduced engine torque. The additional one of the clutches may also be disengaged in response to total energy dissipated in the clutch, to avoid excessive heat build-up or thermal damage.

Referring back to FIG. 2, an example transmission tie-up will be described for box 116. In this example, the transmission 26 is in fourth gear with clutches 96, 102, 104, and 106 engaged. Assume that the desired powertrain torque of box 126 is 50 newton-meters (N·m) at the transmission output shaft and the desired powertrain torque reduction of box 108 is 58 N·m. In fourth gear, clutch 98 may be the associated tie-up clutch that is partially engaged to reduce torque of the transmission output shaft 92 in situations requiring transmission braking. The arbitrator will output a desired torque (50 N·m in this example) for the output shaft 92 to the PCM. The PCM also receives current engine torque from the ECU, which in this case is the minimum engine torque from box 114. Using this data, the PCM can determine the current torque of the input shaft 90 (40 N·m in this example) and the current torque of the output shaft 92. The torque of the output shaft is equal to the input shaft torque× the gear ratio+/−losses. In this example, neglecting losses, the output-shaft torque is 72 N·m (40×1.8). Thus, an additional 22 N·m must be provided by transmission braking to provide the desired 50 N·m at the transmission output shaft.

Once the desired transmission-braking torque is calculated, the PCM calculates the torque capacity of the tie-up clutch 98 required to achieve the braking torque. The torque capacity is a function of the speed ratio between the tie-up clutch and the output shaft 92. The torque capacity for each of the tie-up clutches may be stored in one or more lookup tables that indicate the clutch capacity needed to achieve a desired transmission-torque reduction. In this example, 50 N·m of torque capacity is commanded to tie-up clutch 98 to achieve a 22 N·m of transmission braking. In the illustrated embodiment, the tie-up clutch 98 is a hydraulic clutch. Torque capacity of the clutch 98 is based on the fluid pressure supplied to the clutch. The PCM may command a torque capacity of the clutch 98 by sending a pulse width signal to a solenoid of the valve body to supply a desired fluid pressure to the clutch 98.

Figure 4:
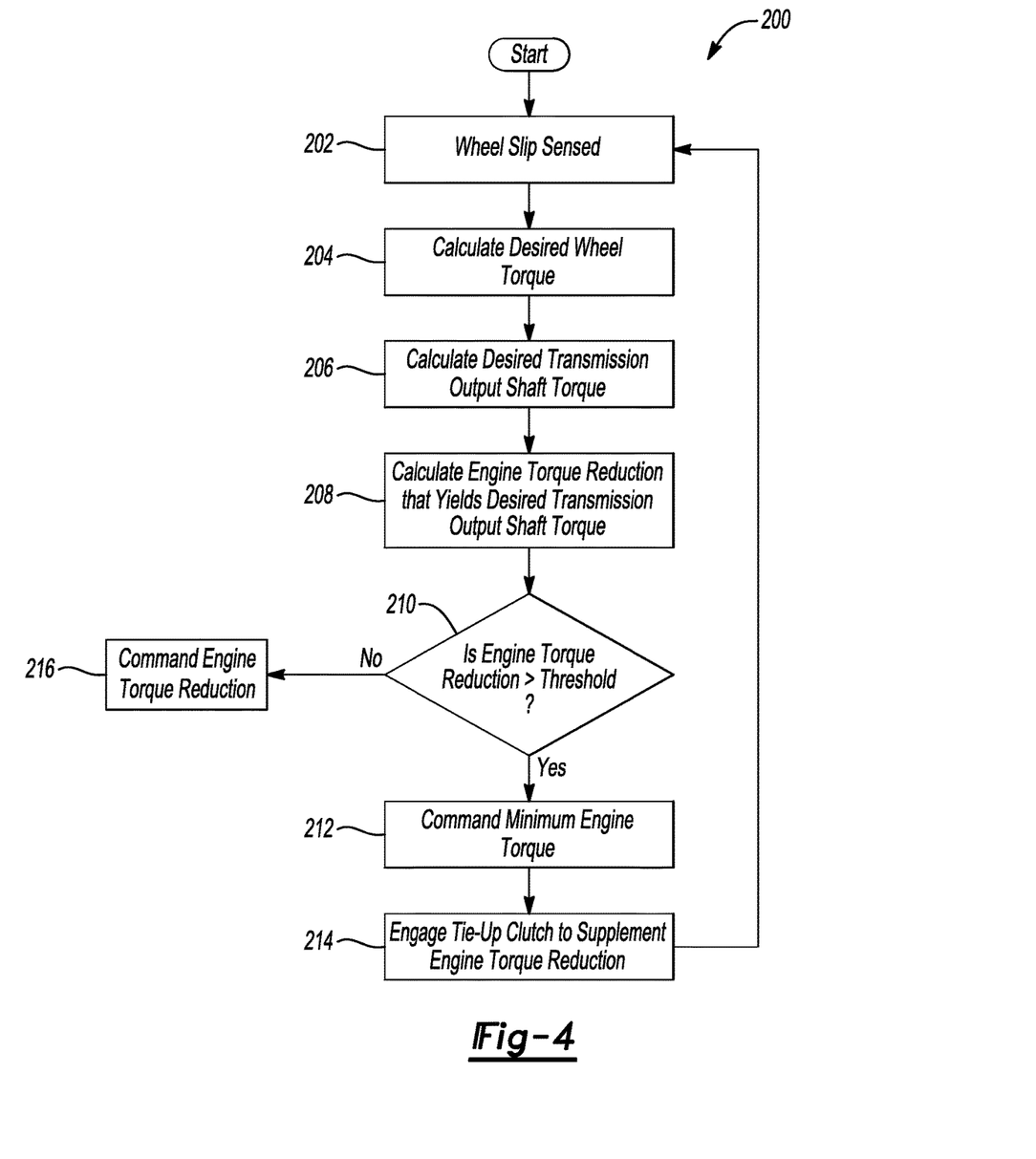
FIG. 4 is an algorithm for executing the method of FIG. 3.

FIG. 4 is an example algorithm 200 that can be used by the controller 42 to execute the method of FIG. 3. The algorithm begins at operation 202 where a sufficient amount of wheel slip is sensed to trigger activation of the traction control system. At operation 204, the controller calculates the desired wheel torques. At operation 206, the controller calculates the desired transmission output shaft torque that will yield the desired wheel torques. At operation 208, the controller calculates an engine torque reduction that yields the desired transmission output shaft torque.

The engine torque reduction of operation 208 is compared to a threshold at operation 210. The threshold may be a constant value or a dynamic value. For example, the threshold may be a percentage of current torque output of the engine, e.g. 20-50%. The threshold may also be based on an engine torque reduction achievable with spark retard, which in turn may be based on current torque output of the engine. If the desired engine torque reduction exceeds the threshold, reducing the engine torque alone cannot provide the desired transmission output torque. Control passes operation 212 and the controller commands the minimum engine torque. At operation 214 the controller engages the tie up clutch to supplement the engine torque reduction in order to provide the desired transmission output shaft torque. If no at operation 210, control passes operation 216 and the controller commands the desired engine torque reduction, which is sufficient to provide the desired transmission output shaft torque.

The algorithm 200 is periodically executed at a predefined frequency and the capacity of the tie-up will be adjusted in each iteration as the minimum engine torque and the wheel slip changes over time. The controller may be programmed to command disengagement of the additional one of the clutches in response to the desired engine torque reduction being below the threshold. The controller may also be programmed to command disengagement of the additional one of the clutches in response to total energy dissipated in the clutch, to avoid excessive heat build-up or thermal damage.

Figure 5:
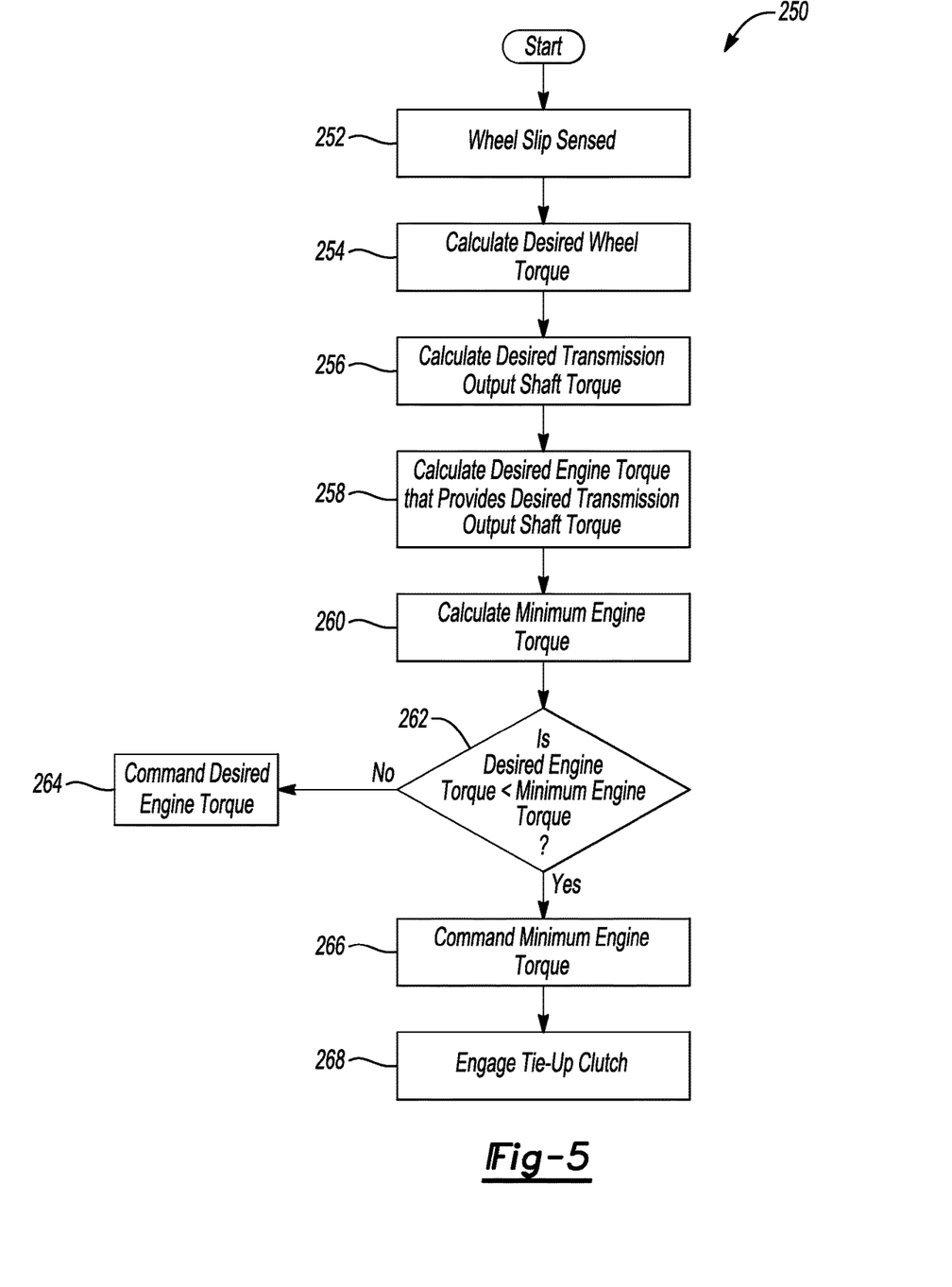
FIG. 5 is another algorithm for executing the method of FIG. 3.

FIG. 5 is another example algorithm 250 that can be used by the controller 42 to execute the method of FIG. 3. The algorithm 250 begins at operation 252 where a sufficient amount of wheel slip is sensed to trigger activation of the traction control system. At operation 254, the controller calculates the desired wheel torques. At operation 256, the controller calculates the desired transmission output shaft torque that will yield the desired wheel torques. At operation 258 the controller calculates the desired engine torque that provides the desired output shaft torque.

As explained above, the engine has a minimum engine torque that can be demanded at any instantaneous time point. At operation 260 the controller calculates the minimum engine torque. Control then passes to operation 262, and the desired engine torque of operation 258 is compared to the minimum engine torque of operation 260. If no at operation 262, the engine alone can sufficiently reduce the torque and the controller commands the desired engine torque at operation 264.

If yes at operation 262, transmission braking may be required to provide the desired transmission output shaft torque. The amount of transmission braking may be equal to the difference between the minimum engine torque minus the desired engine torque. At operation 266 the controller commands the engine to produce the minimum torque. At operation 268 the controller commands engagement of the tie-up clutch to supplement the torque reduction of the engine. At operation 268 the controller will command a torque capacity to the tie-up clutch that yields the desired transmission braking torque.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A vehicle comprising:
   a transmission including input and output shafts and clutches engageable in combinations to create power-flow paths between the input and output shafts;
   wheels driven by the output shaft; and
   a controller programmed to
   engage one of the combinations, and
   responsive to the wheels slipping and a desired engine torque reduction exceeding a threshold, command capacity to an additional one of the clutches to reduce torque of the output shaft.

2. The vehicle of claim 1, wherein the threshold is a percentage of engine torque during the wheels slipping.

3. The vehicle of claim 1, wherein the threshold is a constant value.

4. The vehicle of claim 1, wherein the threshold is based on an engine torque reduction achievable with spark retard.

5. The vehicle of claim 1, wherein the controller is further programmed to command disengagement of the additional one of the clutches in response to the desired engine torque reduction being below the threshold.

6. The vehicle of claim 1, wherein the commanded capacity to the additional one of the clutches is based on the difference between a desired torque of the output shaft and an actual torque of the output shaft.

7. The vehicle of claim 1, wherein the controller is further programmed to command a minimum engine torque in response to the wheels slipping and the desired engine torque reduction exceeding the threshold.

8. A vehicle comprising:
   an engine;
   a transmission coupled to the engine and including an input shaft, an output shaft, and clutches engageable in at least a first combination, which is a subset of the clutches, to create a gear ratio between the input and output shafts, wherein the gear ratio has an associated tie-up clutch that is configured to exert a braking torque on the output shaft when the tie-up clutch is partially engaged; and
   a controller programmed to, responsive to wheel slip being detected and a requested torque reduction of the engine exceeding a threshold, commanding torque capacity to the tie-up clutch to reduce torque of the output shaft.

9. The vehicle of claim 8, wherein the threshold is a percentage of current torque output of the engine.

10. The vehicle of claim 9, wherein the threshold is between 25 and 50 percent.

11. The vehicle of claim 8, wherein the threshold is based on a torque reduction of the engine achievable with spark retard.

12. The vehicle of claim 8, wherein the controller is further programmed to command disengagement of the tie-up clutch in response to the requested engine torque reduction dropping below the threshold.

13. The vehicle of claim 8, wherein the commanded capacity to the tie-up clutch is based on the difference between a requested torque of the output shaft and an actual torque of the output shaft.

14. The vehicle of claim 8, wherein the controller is further programmed to command a minimum engine torque in response to (i) the wheels slipping and (ii) the requested engine torque reduction exceeding the threshold.

15. A method of controlling a vehicle powertrain including a transmission having at least one tie-up clutch configured to reduce output torque of the transmission when engaged, the method comprising:
   responsive to wheel slip being detected and a requested engine torque being undeliverable, (i) commanding a minimum engine torque and (ii) commanding torque capacity to the tie-up clutch to reduce the output torque of the transmission to a value corresponding with the requested engine torque.

16. The method of claim 15, wherein the commanded torque capacity is based on a difference between the requested engine torque and the minimum engine torque.

\* \* \* \* \*